(12) United States Patent  (10) Patent No.: US 8,083,182 B2
Cacciaguerra  (45) Date of Patent: Dec. 27, 2011

(54) MONOLITHIC SELF-STIFFENED PANELS

(75) Inventor: Bruno Cacciaguerra, Clermont le Fort (FR)

(73) Assignee: Airbus France, Toulouse (FR)

(*) Notice: Subject to any disclaimer, the term of this patent is extended or adjusted under 35 U.S.C. 154(b) by 852 days.

(21) Appl. No.: 11/996,302

(22) PCT Filed: Jul. 12, 2006

(86) PCT No.: PCT/EP2006/064154
§ 371 (c)(1),
(2), (4) Date: Jun. 27, 2008

(87) PCT Pub. No.: WO2007/009923
PCT Pub. Date: Jan. 25, 2007

(65) Prior Publication Data
US 2009/0101756 A1  Apr. 23, 2009

(30) Foreign Application Priority Data
Jul. 20, 2005 (FR) ...................................... 05 52255

(51) Int. Cl.
*B64C 1/14* (2006.01)
(52) U.S. Cl. .................. 244/129.4; 244/129.5; 244/119; 244/123.1; 244/123.2; 244/123.3; 244/102 R; 244/133
(58) Field of Classification Search .............. 244/102 R, 244/119, 123.1, 123.2, 123.3, 123.4, 129.4, 244/129.5, 133
See application file for complete search history.

(56) References Cited

U.S. PATENT DOCUMENTS

| 1,469,220 | A | * | 10/1923 | Kemp ........................ 244/133 X |
| 2,258,858 | A | * | 10/1941 | Meadowcroft ............. 244/133 X |
| 3,195,841 | A | * | 7/1965 | Krohn .................... 244/123.2 X |
| 3,775,238 | A | * | 11/1973 | Lyman .................... 244/123.3 X |
| 3,995,080 | A | * | 11/1976 | Cogburn et al. ........ 244/123.3 X |
| 4,471,609 | A | | 9/1984 | Porter et al. |
| 4,749,155 | A | * | 6/1988 | Hammer et al. ........... 244/119 X |
| 4,893,964 | A | * | 1/1990 | Anderson ............. 244/123.3 X |
| 4,916,027 | A | * | 4/1990 | DelMundo ................ 244/119 X |
| 5,036,770 | A | * | 8/1991 | Llewellin et al. ....... 244/129.5 X |
| 6,047,925 | A | * | 4/2000 | Rivera et al. ............... 244/129.4 |
| 6,268,049 | B1 | * | 7/2001 | Childress ............... 244/123.1 X |
| 6,502,788 | B2 | * | 1/2003 | Noda et al. ................ 244/123.3 |
| 7,074,474 | B2 | * | 7/2006 | Toi et al. .................... 244/119 X |
| 7,578,477 | B2 | * | 8/2009 | French et al. .............. 244/129.5 |

(Continued)

FOREIGN PATENT DOCUMENTS
DE  19639339 A1  3/1998

*Primary Examiner* — Rodney B White
(74) *Attorney, Agent, or Firm* — Perman & Green, LLP

(57) ABSTRACT

A composite panel having a first skin forming the outer wall of the panel, known as the lower face (1), and a second skin forming part of the inner wall of the panel. The second skin is formed hollow such as to produce an inner reinforcing frame (2) in the form of a half-box structure (3) which, together with the first skin, forms box parts. The aforementioned frame is equipped with a rim (4a, 4b) for fixing to the first skin, a face known as the upper face (5) and connecting side walls (6, 6a, 6b, 6c, 6d, 6e, 7) between the rim (4a, 4b) and the upper face (5) the first and second skins forming a monolithic self-stiffened panel. The half-box frame (2) has perforated sections (8) which are defined by hollow beam sections forming the half-box frame (2).

14 Claims, 3 Drawing Sheets

U.S. PATENT DOCUMENTS

| | | | |
|---|---|---|---|
| 7,600,716 B2 * | 10/2009 | French et al. | 244/129.5 |
| 7,631,840 B2 * | 12/2009 | Kallinen et al. | 244/123.1 X |
| 7,716,835 B2 * | 5/2010 | Johnson et al. | 244/119 X |
| 7,823,834 B2 * | 11/2010 | French et al. | 244/129.5 |
| 7,851,048 B2 * | 12/2010 | Brandon et al. | 244/123.1 X |
| 7,861,969 B2 * | 1/2011 | Guzman et al. | 244/119 X |
| 2002/0043588 A1 * | 4/2002 | Bold et al. | 244/129.5 |
| 2002/0100840 A1 | 8/2002 | Billinger et al. | |
| 2003/0042364 A1 * | 3/2003 | Tanaka et al. | 244/123 |
| 2008/0210821 A1 * | 9/2008 | Tanner et al. | 244/123.3 |
| 2010/0032521 A1 * | 2/2010 | De Ruffray et al. | 244/102 R X |
| 2010/0294888 A1 * | 11/2010 | Texcier et al. | 244/129.5 |

* cited by examiner

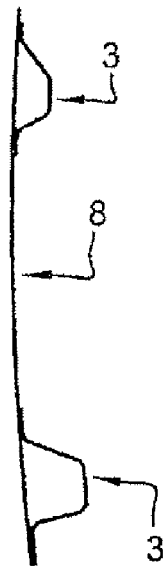 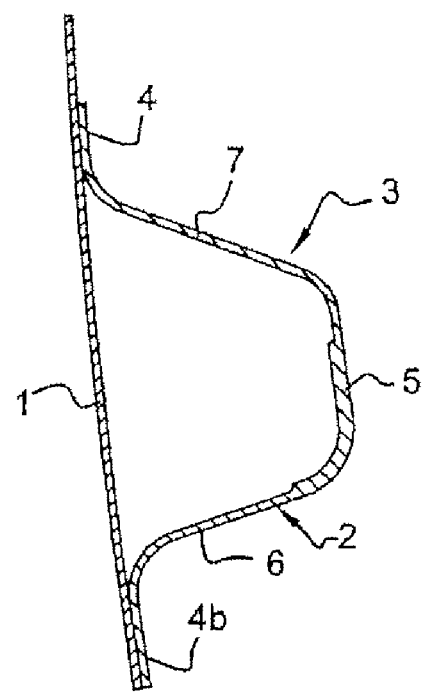
Fig. 4　　　　Fig. 5a
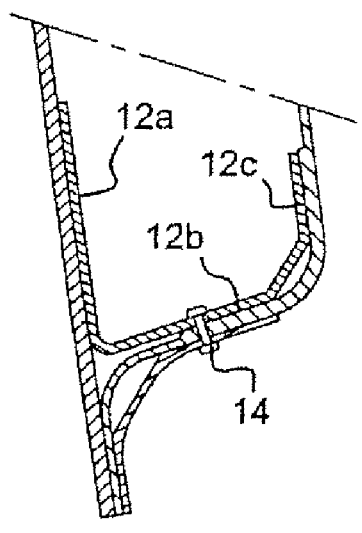 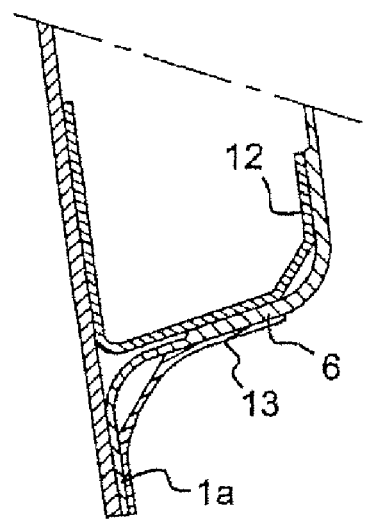
Fig. 5b　　　　Fig. 5c

MONOLITHIC SELF-STIFFENED PANELS

CROSS-REFERENCE TO RELATED APPLICATIONS

This application is the National Stage of International Application No. PCT/EP2006/064154, International Filing Date, 12 Jul. 2006, which designated the United States of America, and which international application was published under PCT Article 21(2) as WO Publication No. WO 2007/009923 and which claims priority from French Application No. 05 52255, filed 20 Jul. 2005.

BACKGROUND

1. Field

The disclosed embodiments relate to a monolithic self-stiffened panel, in particular a composite panel for an aircraft landing gear door.

2. Brief Description

The panels of landing gear doors for aircraft are panels which must be light, whilst at the same time tolerating numerous openings and closures, must generate little drag and must be capable of withstanding considerable thermal, vibratory and aerodynamic stresses.

Traditional constructions of landing gear doors utilize metal panels, on which fittings are directly fixed. Embodiments using composite panels do exist, but the fixing of the fittings remains complex.

One difficulty of replacing the traditional metal panels by sandwich panels made of composite materials is that these panels are more sensitive to impacts and are prone to fill with water without being able to be emptied. It is necessary, on the one hand, to reinforce the panels, which makes their weight balance less favorable, and, on the other hand, to make them seal-tight, which is complex.

As regards the fixing of the fittings, document WO99/26841 A1 in the name of the Applicant relates to the realization of a panel comprising mounted stiffeners and fittings fixed on the panel. This embodiment using multi-ply composite materials, particularly suitable for producing a fan cowling of a jet engine, nevertheless remains relatively weighty and a more economical and lighter realization is sought.

SUMMARY

The disclosed embodiments allow the realization of composite door panels offering good endurance, and a weight lighter than a traditional metal solution by allowing the fittings to be fixed directly on the panel without the need for intermediate stiffeners, the materials of which are not prone to fill with water, whilst the panel, furthermore, is easily drainable.

To this end, the disclosed embodiments relate to a composite panel comprising a first skin forming the outer wall of the panel, the so-called bottom face, and a second skin forming part of the inner wall of the panel, characterized in that the second skin is formed hollow to constitute an inner reinforcing frame forming at least one hollow-profile stiffener, this being provided with flanged edges for fixing to the first skin, with a face, the so-called top face, and with connecting flanks between said edges and said top face, the frame producing with the first skin a monolithic self-stiffened panel.

Advantageously, the inner reinforcing frame produces a plurality of hollow-profile stiffeners distributed over the circumference of the panel.

More particularly, the frame comprises cutouts delimited by box beam portions. According to the disclosed embodiments, the frame is realized, in particular, by stamping of the second skin, the skins themselves being made of thermoplastic-matrix composite materials.

BRIEF DESCRIPTION OF THE DRAWINGS

Other characteristics and advantages of the disclosed embodiments will be better appreciated from a reading of the following description of a non-limiting example of the disclosed embodiments with reference to the figures, which represent:

in FIG. 4: a sectional view along an axis JJ of the panel of FIG. 3;
in FIGS. 5a, 5b, 5c: detailed views along partial sections of the panel of FIG. 3.

DETAILED DESCRIPTION

Figure 1:
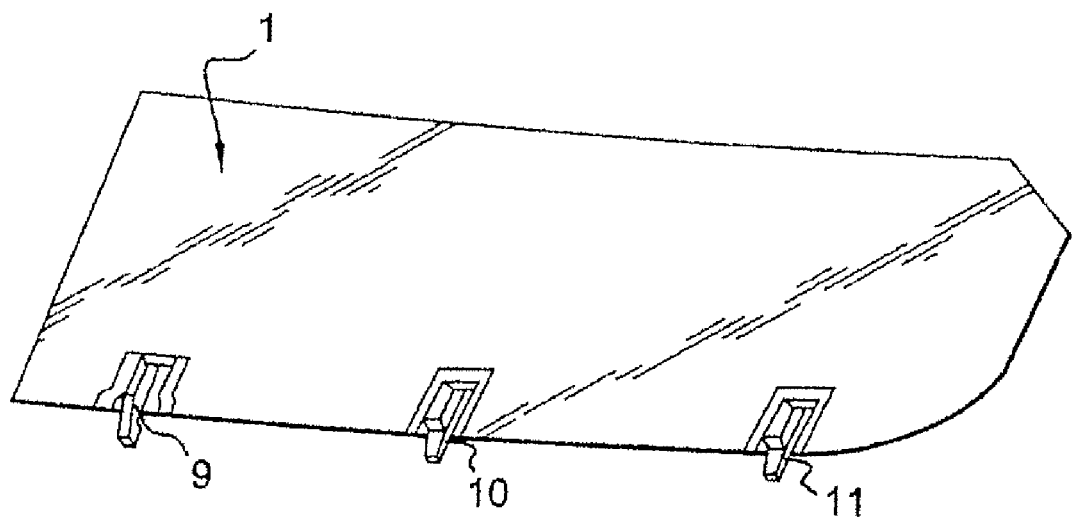
in FIG. 1: a perspective bottom view of a panel according to the disclosed embodiments.
Figure 2:
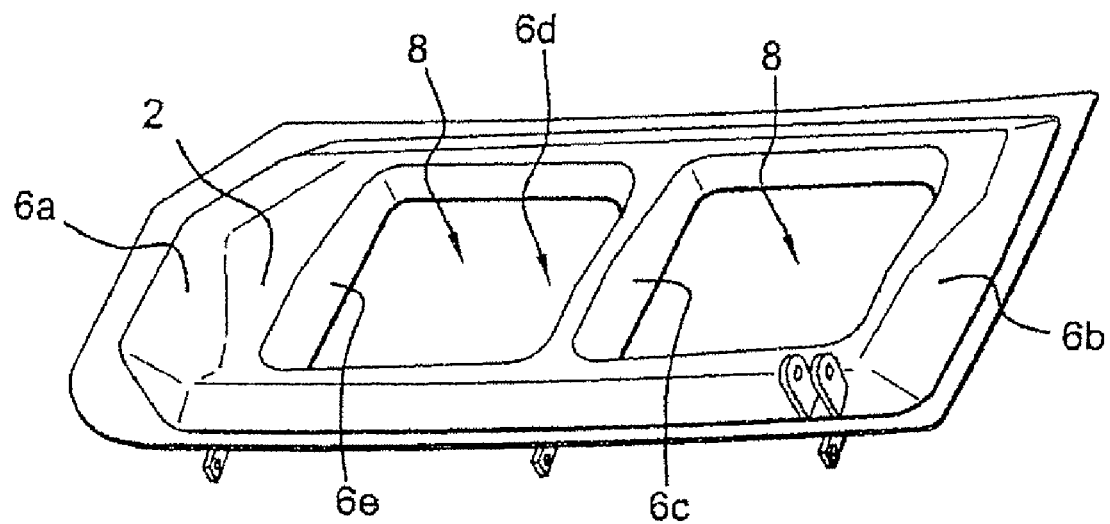
in FIG. 2: a perspective top view of the panel of FIG. 1.

The composite panel represented in FIGS. 1 and 2 is a landing gear door panel of an aircraft.

According to the disclosed embodiments, the panel comprises a first skin forming the outer wall of the panel, the bottom face 1 in FIG. 1, and a second skin forming part of the inner wall of the panel.

In order to obtain a high degree of rigidity for the panel such that no supplementary structural stiffening element is necessary, the second skin is formed hollow to constitute a hollow inner reinforcing frame 2, with an omega or other profile, producing with the first skin a set of box beams 3 implanted on the inner part of the panel and, in particular, on the circumference of the panel.

According to the example represented, in particular, in FIG. 2, the frame 2 comprises cutouts 8 delimited by stiffener elements constituting the frame 2.

The stiffener elements comprise side flanks and a top face and are provided with a profile of hollow section, for example in an omega shape, or comprise, for example, gently sloping side flanks 6a, 6b, 6c, 6e on the side of the cutouts to reduce the aerodynamic drag of the panel.

The inner reinforcing frame 2 thus produces a plurality of hollow-profile stiffeners distributed over the circumference of the panel and comprises cutouts 8 delimited by box beam portions.

Figure 3:
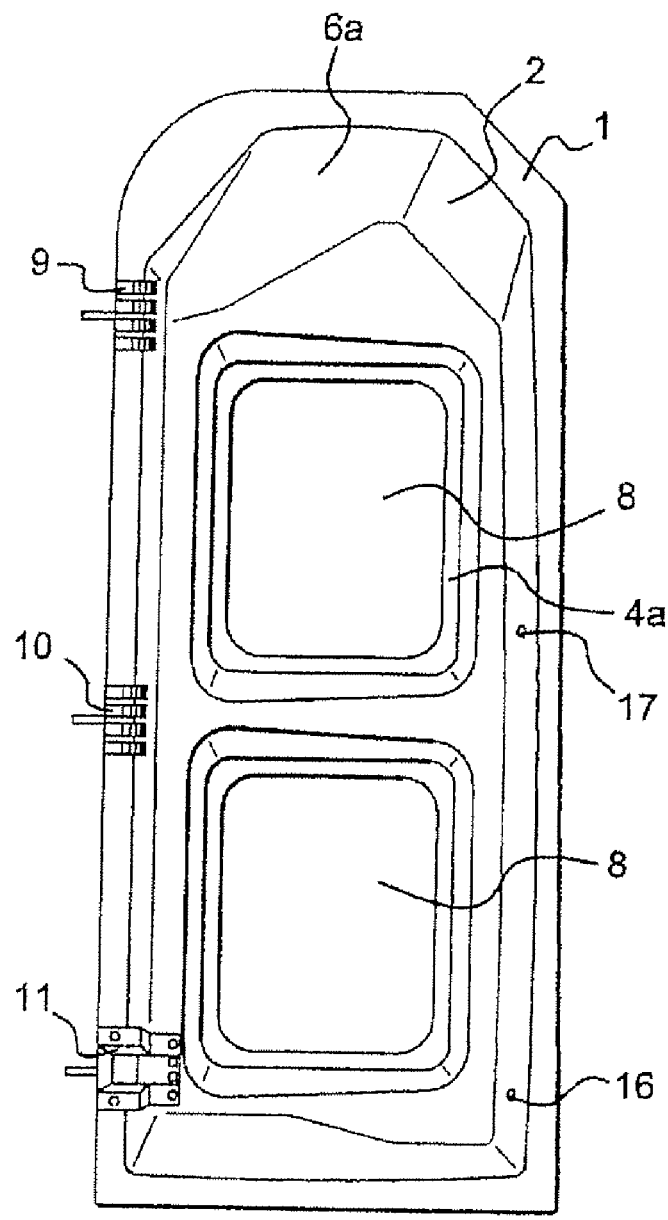
in FIG. 3: a top view of the panel of FIG. 1.

The view of FIG. 4, a sectional view of the panel of FIG. 3 along an axis passing approximately through the centre of one of the cutouts of the second skin, represents two sections through portions of stiffeners shaped as hollow beams framing the cutout of the second skin, the second skin being fixedly connected to the first skin.

Figure 7:
in FIG. 7: a side view of the panel of FIG. 3.

The frame 2 thus forms a stiffener for the lightened panel and is designed to transmit and distribute the forces from the panel onto the fittings 9, 10, 11 constituting connecting elements to the fuselage, represented, in particular, in FIG. 3 and in FIG. 7 showing a side view of the panel, which connecting elements ensure the attachment of the panel to the fuselage and enable the panel to rotate to allow the opening and closing of the landing gear door constituted by at least two identical panels according to the disclosed embodiments.

The skins which make up the panel are made, for example, of thermoplastic-matrix composite materials, and the frame 2 is produced by stamping of the second skin to give it its profile that produces stiffeners in the form of hollow-section beams surrounding the two cutouts 8.

For the realization of the panel, the second skin is glued onto the first skin and, to this end, is provided with a fixing flange, constituted by flanged edges 4a, 4b represented, in particular, in the detailed sectional view in FIG. 5a of a section through the panel represented in top view in FIG. 3.

The flanged edges 4a, 4b allow the second skin to be glued to the first skin. They extend along the pierced sections 8 and along the outer profile of the inner wall of the panel constituted with the second skin.

The inner wall additionally comprises a top face 5, connecting flanks 6, 6a, 6b, 6c, 6d, 6e, 7 between the flanges 4a, 4b and said, possibly pierced, top face 5.

A section through the panel according to the example is represented, more particularly, according to the detail K of FIG. 5a. In this detail, a particular realization for which the top face 5 and a part of a flank 6 comprises a thickened zone reinforcing the profile of the stiffener.

By virtue of its structure made up of a first and a second skin, which are advantageously glued together but which can also be fixedly connected by fixing means disposed on the edges 4a, 4b, the panel constitutes a monolithic self-stiffened panel, which can comprise drainage means to prevent water retention.

As indicated above, the panel comprises connecting elements 9, 10, 11 for connection to the fuselage. These connecting elements comprise connecting fittings in the form of an inner counter-fitting 12 and an outer fitting 13 for their connection to the panel.

According to the disclosed embodiments and according to the details represented in FIGS. 5b and 5c for two of the fixings of the panel, the inner counter-fitting 12 comprises a generally U-shaped profile, whereof a first side branch 12a rests against the inner face of the first skin, the center branch 12b rests against a flank of the stiffener, and the second side branch 12c rests against the inner wall of the top face of the box forming the inner wall of the panel.

This inner counter-fitting is fixed to the inside of the top face of the panel constituted by the second skin before the latter is fitted together with the first skin.

The outer fitting 13 bears upon an inner flange 1a of the panel constituted by the inner face of the first skin and the outer face of one of the connecting flanks 6.

The counter-fitting and the outer fitting are joined together through the connecting flank of the second skin by riveting or bolting 14, for example.

Thus, the fittings supporting the fixing means of the panel are directly attached to the two skins of the self-stiffened panel and the realization in the form of a fitting and counter-fitting bearing on the first and second skin distributes the forces over these two skins and over the whole of the self-stiffened panel.

Figure 6:
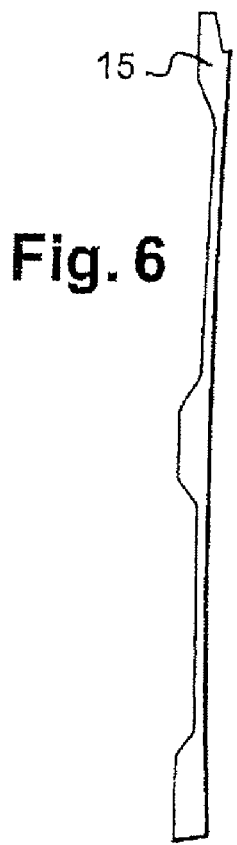
in FIG. 6: a side view of a reinforcing fitting according to the disclosed embodiments.

According to an advantageous embodiment, a fitting forming a reinforcing insert 15 represented in FIG. 6 is disposed in the beam of the frame facing a receiving zone for the connecting fitting elements 9, 10, 11 for connection with the fuselage, so as to rigidify the panel in the fixing zone of the outer fittings.

In order to lend an aerodynamic profile to the panel, at least one connecting flank 6a, 6b, 6c, 6d, 6e, and, in particular, at least one of the flanks orientated in a direction substantially perpendicular to the axis of the connecting fittings 9, 10, 11, constitutes an inclined surface of progressive transition between the outer skin and the top face such as to constitute an aerodynamic profile.

Similarly, the cross section of the panel can reduce toward the side opposite to the connecting elements, as is represented according to the example of FIG. 7.

The panel according to the disclosed embodiments exhibits a high rigidity whilst having a low mass and, due to its aerodynamism, generates little noise and little drag. In addition, it can be easily drained by making holes 16, 17, preferably on the panels.

The disclosed embodiments are not limited to the represented example and, in particular, a panel comprising a single cutout or more than two cutouts remains within the scope of the disclosed embodiments.

The invention claimed is:

1. A composite panel comprising a first skin forming an outer wall of the panel, and a bottom face of said panel, and a second skin forming part of an inner wall of the panel, wherein the second skin is formed hollow to constitute an inner reinforcing frame forming at least one hollow-profile stiffener, this being provided with flanged edges for fixing to the first skin, with a face, forming a top face of said panel with connecting flanks between said edges and said top face, the frame of the second skin together with the first skin providing a monolithic self-stiffened panel and wherein the inner reinforcing frame produces a plurality of hollow-profile stiffeners distributed over a circumference of the panel, the frame including cutouts delimited by beam portions made by said hollow profile stiffeners.

2. The composite panel as claimed in claim 1, wherein the frame is formed through a stamping process of the second skin.

3. The composite panel as claimed in claim 1, wherein the skins are made of thermoplastic-matrix composite materials.

4. The composite panel as claimed in claim 1, wherein said composite panel comprises connecting elements comprising connecting fittings in the form of an inner counter-fitting and an outer fitting.

5. The composite panel as claimed in claim 4, wherein the inner counter-fitting comprises a generally U-shaped profile, whereof a first side branch rests against the inner face of the first skin, the center branch rests against a flank of the stiffener, and the second side branch rests against the inner wall of the top face of the stiffener forming the inner wall of the panel.

6. The composite panel as claimed in claim 4, wherein the outer fitting bears upon an inner flange of the panel constituted by the inner face of the first skin and the outer face of one of the connecting flanks.

7. The composite panel as claimed in claim 6, wherein the counter-fitting and the outer fitting are fixed together through the connecting flank.

8. The composite panel as claimed in claim 4, wherein a plurality of fittings are joined together to constitute a reinforcing insert disposed in the beam of the frame facing a receiving zone for the connecting fitting elements.

9. The composite panel as claimed in claim 1, wherein at least one connecting flank orientated in a direction substantially perpendicular to the axis of the connecting fittings constitutes an inclined surface of progressive transition between the outer skin and the top face such as to constitute an aerodynamic profile.

10. A composite panel comprising a first skin forming an outer wall of the panel and a bottom face of the panel, and a second skin forming part of an inner wall of the panel, wherein the second skin is formed hollow to constitute an inner reinforcing frame forming at least one hollow-profile stiffener, this being provided with flanged edges for fixing to the first skin, with a top face forming a top face of the panel, with connecting flanks between said edges and said top face, the frame producing with the first skin a monolithic self-stiffened panel wherein said composite panel comprises connecting elements including connecting fittings in the form of an inner counter-fitting and an outer fitting.

11. The composite panel according to claim 10, wherein the frame is formed through a stamping process of the second skin.

12. The composite panel according to claim 11, wherein the inner reinforcing frame produces a plurality of hollow-profile stiffeners distributed over a circumference of the panel.

13. The composite panel according to claim 11, wherein the inner reinforcing frame produces a plurality of hollow-profile stiffeners distributed over the circumference of the panel and wherein the frame comprises cutouts delimited by box beam portions.

14. The composite panel according to claim 10, wherein the inner reinforcing frame produces a plurality of hollow-profile stiffeners distributed over a circumference of the panel and wherein the frame comprises cutouts delimited by box beam portions.

\* \* \* \* \*